United States Patent [19]

Bauer

[11] 4,369,115

[45] Jan. 18, 1983

[54] MIXING WASTE WITH OXYGEN IN A WET OXIDATION PROCESS

[75] Inventor: Gerald L. Bauer, Rothschild, Wis.

[73] Assignee: Sterling Drug, Inc., New York, N.Y.

[21] Appl. No.: 193,615

[22] Filed: Oct. 3, 1980

Related U.S. Application Data

[63] Continuation-in-part of Ser. No. 91,111, Nov. 5, 1979, abandoned, which is a continuation-in-part of Ser. No. 80, Jan. 2, 1979, abandoned, which is a continuation-in-part of Ser. No. 834,232, Sep. 19, 1977, abandoned.

[51] Int. Cl.³ .............................................. C02F 1/74
[52] U.S. Cl. .............................. 210/761; 261/64 R; 261/66; 261/76
[58] Field of Search .............................. 210/758–763, 210/136, 198.1, 199, 205, 206, 209, 220; 261/64 R, 66, 76, 78 A, 121 R, DIG. 13, DIG. 76

[56] References Cited

U.S. PATENT DOCUMENTS

| | | | |
|---|---|---|---|
| 1,211,691 | 1/1917 | Eisendrath | 261/DIG. 76 |
| 2,126,164 | 8/1938 | Anderson | 210/761 |
| 3,272,739 | 9/1966 | Earle | 210/761 |
| 3,549,528 | 12/1970 | Armstrong | 210/761 |
| 3,579,554 | 9/1971 | Boudreau | 210/761 |
| 3,647,687 | 3/1972 | Matthiesen | 210/758 |
| 3,649,534 | 3/1972 | Schotte | 210/761 |
| 3,704,570 | 12/1972 | Gandenier | 261/DIG. 76 |
| 3,835,048 | 9/1974 | Walter | 210/758 |
| 4,053,404 | 10/1977 | Van Kirk | 210/758 |
| 4,174,280 | 11/1979 | Pradt | 210/758 |

*Primary Examiner*—Ernest G. Therkorn
*Attorney, Agent, or Firm*—Charles R. Fay

[57] ABSTRACT

A safe method for mixing pure oxygen, or an oxygen enriched gas, at high pressure, with waste liquor in a wet oxidation system, such that intermittent drying conditions are avoided, thereby preventing possible spontaneous combustion, fire or explosion; comprising adding the oxygen to pure liquid water before it is mixed with the waste liquor.

2 Claims, 1 Drawing Figure

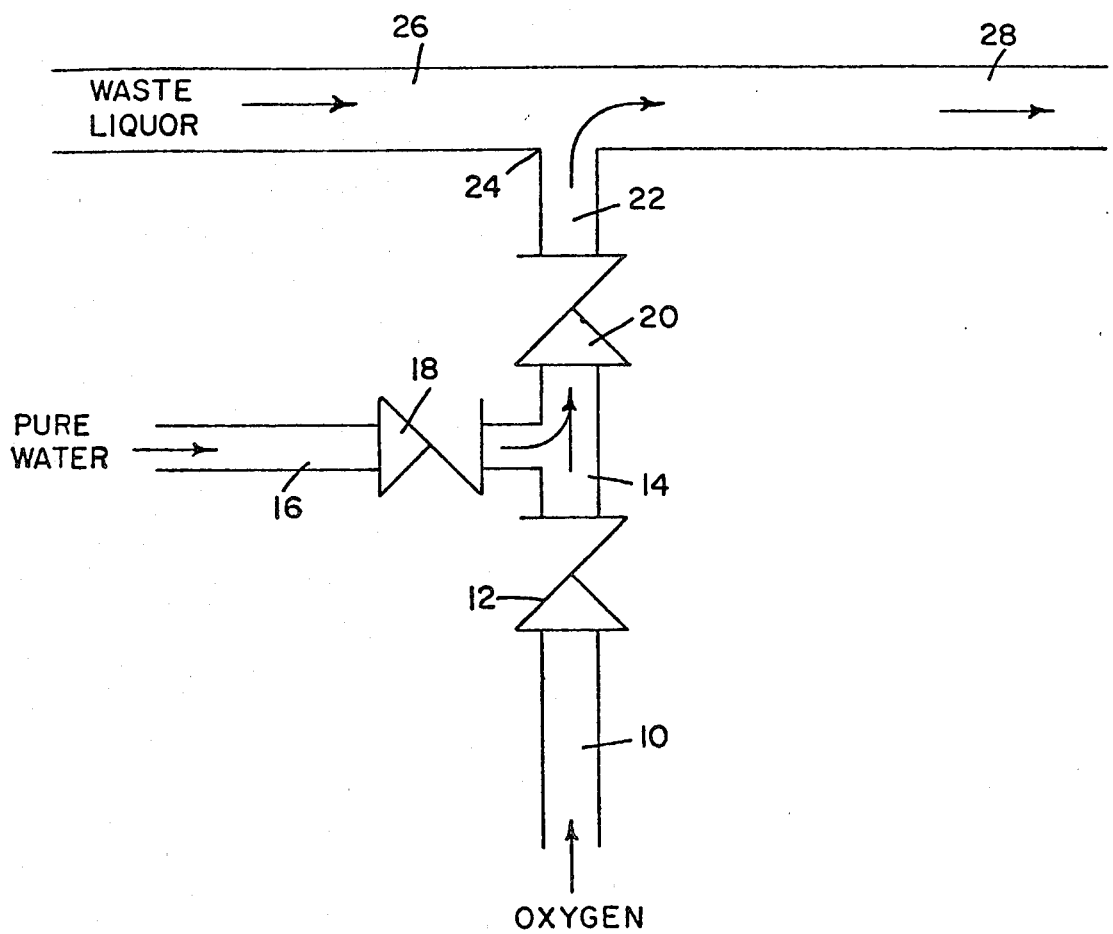

MIXING WASTE WITH OXYGEN IN A WET OXIDATION PROCESS

This application is a continuation-in-part of Ser. No. 91,111, filed Nov. 5, 1979, now abandoned, in turn a continuation-in-part of Ser. No. 80, filed Jan. 2, 1979, now abandoned, in turn a continuation-in-part of Ser. No. 834,232, filed Sept. 19, 1977, now abandoned.

BACKGROUND OF THE INVENTION

Pollution control by oxidation of aqueous solutions or suspensions of organic waste products with an oxygen-containing gas at high temperature and pressure is a well-known procedure known as wet oxidation; see for example Zimmermann U.S. Pat. No. 2,665,249.

In prior art wet oxidation processes, waste liquor and compressed air can be directly mixed with no hazard, but if pure oxygen or an oxygen enriched gas is used to supply oxygen for the oxidation process, special precautions have to be taken to prevent a spontaneous combustion occurring at the point oxygen and waste liquor are being mixed. The primary hazard is caused by the undesirable introduction of combustible materials into the oxygen supply line, together with intermittent wetting and drying in the line such that a dry film of combustible material forms on the pipe surface and comes into direct contact with the oxygen or oxygen bearing gas. This dry combustible film ignites spontaneously, leading to fire, explosion and failure of pressurized equipment. The wetting-drying condition may be caused by an interruption in the flow or gas or liquid or even by normal variation in the flow of the gas and the liquor, or normal variations in system pressure.

In U.S. Pat. No. 4,174,280, wet oxidation of oxidizable materials which are insoluble, immiscible and difficult to suspend or emulsify in water, is accomplished by separately injecting the oxidizable materials into a sealed reactor as a separate concentrated stream. Air or oxygen is introduced into the reactor either as a separate stream or as a mixture with water or aqueous solution or suspension. Contact between oxidizable material, water and oxygen occurs in the reactor, thus preventing premature oxidation of slugs of the oxidizable material.

In U.S. Pat. No. 3,835,048, mixing of steam with pure oxygen is set forth as a safe method of increasing oxygen transfer to a waste liquor. I have found, however, that dilution of oxygen with steam is hazardous in a system in which wet oxidation occurs.

If for any reason the flow of steam is interrupted or reduced in volume, normal heat losses from the oxygen supply line result in condensation of the steam, markedly reducing its volume and creating a momentary partial vacuum in the line. Waste liquor containing oxidizable material is thus drawn into the line where spontaneous combustion will occur.

Even under normal operating conditions, small pressure surges occur in the system. Steam, being a compressible gas which condenses at pressures greater than its vapor pressure, will alternately condense and vaporize, drawing waste liquor further into the line containing oxygen as it condenses, and drying combustible solids in the line as it vaporizes, leading to dangerous spontaneous combustion.

In the following summary and in the description of the preferred embodiment of this invention, the words "pure water" or "water" will always refer to water in the liquid state.

SUMMARY OF THE INVENTION

In order to obviate the possibility of spontaneous combustion, the oxygen or oxygen-containing gas flows at high pressure to a point where it is mixed with a stream of pure water which should be distilled, deionized, or potable water from which the hardness and substantially all oils, grease or other oxidizable substances have been removed. This water flows through an intake to e.g. a conventional tee where it is mixed with the oxygen or oxygen enriched gas.

The water-oxygen material now mixed then flows through a pipe to another tee or the like where it is mixed with the waste liquor flowing to the reactor. This may be a location in a pipe line carrying the waste liquor to wet oxidation reactor.

This eliminates the possiblity of the formation of any dry deposits of combustible materials which may come in direct contact with high pressure oxygen or oxygen enriched gas.

BRIEF DESCRIPTION OF THE DRAWING

The FIGURE in the drawing is a diagrammatic representation illustrating the invention therein.

PREFERRED EMBODIMENT OF THE INVENTION

A pipe 10 leads oxygen or oxygen enriched gas through a check valve 12 and then to e.g. a tee 14, the other leg of which is a pipe 16 accommodating the flow of pure water in the direction of the arrow through another check valve 18 into the tee to mix with the oxygen.

This mixture then flows through a third check valve 20, a pipe 22 and another tee 24, one leg of the tee accommodating the waste liquor as at 26. The water and oxygen bearing gas are mixed in the tee 24 and thence proceed through another pipe or equivalent 28 to the reactor.

In this invention it is emphasized that the oxygen or oxygen enriched gas must be mixed with water before it is used in wet oxidation. The purpose of the water injection is to eliminate any possibility of the formation of any dry deposits of combustible material in direct contact with the high pressure oxygen. This is accomplished by preventing any liquid containing combustible materials from flowing into or contaminating the oxygen supply line and by preventing the formation of dry spots in the areas which have been in contact with waste liquor, and forming more positive and cleaner seals in the check valves 12 and 20 in case of any interruption to the flow of oxygen.

The amount of water mixed with the oxygen or oxygen enriched gas is also important. If too little water is used, the surface of pipes 14 and 22 may not be sufficiently wetted to prevent combustion. Moreover, if too little water is mixed with the oxygen or oxygen enriched gas, the water may all evaporate at the point of mixing and thus leave insufficient water remaining to prevent back flow of the waste liquor into the oxygen supply line. There may also not be enough water to prevent backflow of waste liquor into lines 22, 14 and 10. This would lead to the type of hazardous situation which this invention is intended to prevent. On the other hand, if too much water is mixed with the oxygen or oxygen enriched gas, the waste liquor will be excessively diluted and the wet oxidation process will be uneconomical.

The amount of water that should be mixed with the oxygen or oxygen enriched gas must be sufficient so that the amount of liquid water remaining unevaporated after the mixing step is between one hundredth of a pound of water per pound of oxygen and ten pounds of water per pound of oxygen. Preferably the amount lies between one-tenth of a pound and one pound of water unevaporated per pound of oxygen.

For the purpose of the present invention, an oxygen enriched gas is a gaseous mixture produced by adding substantial amounts of oxygen to air or an inert gas such that the resultant mixture contains at least about 25 percent by volume of oxygen.

I claim:

1. In a process for carrying out a wet oxidation of a waste liquor with oxygen or an oxygen enriched gas in a reactor, the improvement which comprises mixing said oxygen or oxygen enriched gas from an oxygen supply line with pure liquid water prior to adding oxygen or oxygen enriched gas to said waste liquor in order to prevent backflow of the waste liquor into the oxygen supply line, wherein the amount of liquid water remaining unevaporated after the mixing step is between one hundredth of a pound of water per pound of oxygen and ten pounds of water per pound of oxygen, and in which the mixture of oxygen or oxygen enriched gas and pure liquid water is added to the waste liquor before the latter is introduced into the reactor.

2. A process according to claim 1 including the steps of utilizing at least one check valve in the oxygen line upstream of the point at which the oxygen and pure liquid water are mixed, at least one check valve in the pure liquid water line upstream from the point at which the pure liquid water is mixed with the oxygen, and at least one check valve in the pure liquid water-oxygen line upstream from the point where the pure liquid water-oxygen mixture is mixed with the waste liquor.

* * * * *